United States Patent
Kreuzer

(10) Patent No.: US 7,867,424 B2
(45) Date of Patent: Jan. 11, 2011

(54) METHOD FOR THE PRODUCTION OF A STEERING WHEEL HAVING A MULTI-COLORED FOAM SURROUNDING

(75) Inventor: Martin Kreuzer, Kleinwallstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 910 days.

(21) Appl. No.: 11/107,522

(22) Filed: Apr. 15, 2005

(65) Prior Publication Data

US 2005/0230862 A1 Oct. 20, 2005

(30) Foreign Application Priority Data

Apr. 16, 2004 (DE) .................. 10 2004 018 462

(51) Int. Cl.
*B29C 65/00* (2006.01)
(52) U.S. Cl. ............. 264/245; 264/328.8; 264/46.7
(58) Field of Classification Search ............ 264/45.1, 264/46.7, 46.9, 241, 245, 246, 247, 328.8, 264/328.3, 264, 254; 428/31; 74/552
See application file for complete search history.

(56) References Cited

U.S. PATENT DOCUMENTS

| 3,523,464 A | | 8/1970 | Quillery et al. |
| 3,726,152 A | | 4/1973 | Tsuneizumi |
| 4,959,002 A | * | 9/1990 | Pleasant ................. 425/192 R |
| 5,628,944 A | * | 5/1997 | Nagasaka et al. .......... 264/46.9 |
| 5,651,998 A | * | 7/1997 | Bertschi et al. ............. 425/127 |
| 5,840,144 A | | 11/1998 | Schumacher et al. |
| 6,386,063 B1 | * | 5/2002 | Hayashi et al. ............... 74/552 |
| 6,579,593 B1 | * | 6/2003 | Mori et al. .................... 74/552 |
| 2002/0008097 A1 | | 1/2002 | Hobby |
| 2004/0050204 A1 | | 3/2004 | Albayrak et al. |

FOREIGN PATENT DOCUMENTS

| DE | 10213799 | 8/2003 |
| DE | 10227196 | 1/2004 |
| EP | 0386818 | 9/1990 |
| WO | 9907578 | 2/1999 |

OTHER PUBLICATIONS

Messler, Robert, "Joining of materials and structures: from pragmatic process to enabling technology", Butterworth-Heinemann, 2004. p. 117.*

* cited by examiner

*Primary Examiner*—Christina Johnson
*Assistant Examiner*—Galen Hauth
(74) *Attorney, Agent, or Firm*—Tarolli, Sundheim, Covell & Tummino LLP

(57) ABSTRACT

A method for the production of a steering wheel with a multi-colored foam surrounding includes the following steps:
formation of a first foam surrounding (12) by surrounding a steering wheel skeleton in a first mold with a first foam, the first foam in solidified state having a first color;
covering of particular regions of the first foam surrounding (12); and
formation of a second foam surrounding (14) by introducing a second foam into a second mold, the second foam in solidified state having a second color different from the first color.

15 Claims, 1 Drawing Sheet

METHOD FOR THE PRODUCTION OF A STEERING WHEEL HAVING A MULTI-COLORED FOAM SURROUNDING

BACKGROUND OF THE INVENTION

The invention relates to a method for the production of a steering wheel having a multi-colored foam surrounding.

Multi-colored steering wheels have been produced hitherto using multi-colored leather coverings. As leather steering wheels are in any case relatively expensive to manufacture and are therefore generally only offered in motor vehicles with superior equipment, there is a need for multi-colored steering wheels which are able to be produced without excessive additional costs.

BRIEF SUMMARY OF THE INVENTION

According to the invention, the method for the production of a steering wheel having a multi-colored foam surrounding comprises the following steps:

formation of a first foam surrounding by surrounding a steering wheel skeleton with foam in a first mold with a first foam, the first foam in solidified state having a first color;

covering of particular regions of the first foam surrounding; and formation of a second foam surrounding by introducing a second foam into a second mold, the second foam in solidified state having a second color different from the first color.

Thus, a multi-colored steering wheel is obtained by multiple surrounding with foam, using foam mixtures of different colors. A multi-colored leather covering on the foam surrounding is no longer necessary. Therefore, a steering wheel can be designed visually more attractive at moderate additional cost, e.g. for special editions of a series vehicle with especially designed interior.

DETAILED DESCRIPTION OF PREFERRED EMBODIMENTS

The method according to the invention for the production of a steering wheel 10 having multi-colored foam surrounding is preferably carried out as follows:

A steering wheel skeleton is placed into a first foaming mold. The skeleton is surrounded with a first foam for the formation of a first foam surrounding 12, using conventional techniques. The foaming mold is designed so that the first foam surrounding 12 is tapered in the regions of the steering wheel 10 which are to have a different color later, compared with the adjoining regions.

The intermediate product is then placed into a second foaming mold. The non-tapered regions of the first foam surrounding 12 are covered by one or more masks. Then, as previously in the production of the first foam surrounding 12, a separating means and thereafter a so-called IMC lacquer (in-mold coating) are applied in a conventional manner.

Figure 1:
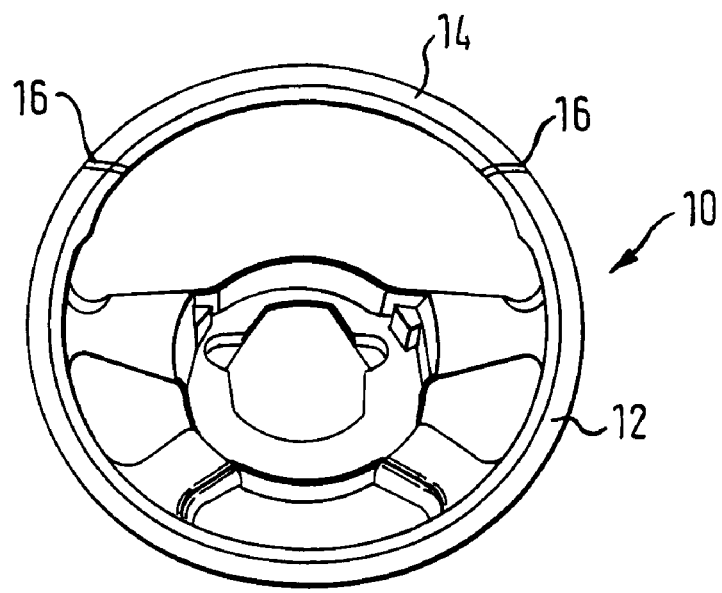
FIG. 1 shows a steering wheel produced in accordance with the invention.

After the removal of the mask(s), the second foaming mold is closed and a second foam mixture is introduced via one or more injection ports, so that a second foam surrounding 14 is produced. The first and the second foam, in the solidified state, have different colors, so that a steering wheel 10 having a multi-colored foam surrounding is formed (see FIG. 1).

Figure 2:
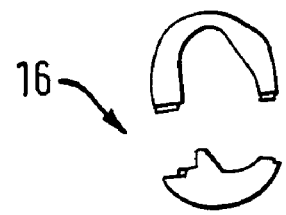
FIG. 2 shows a decorative element for a steering wheel produced in accordance with the invention.
Figure 3:
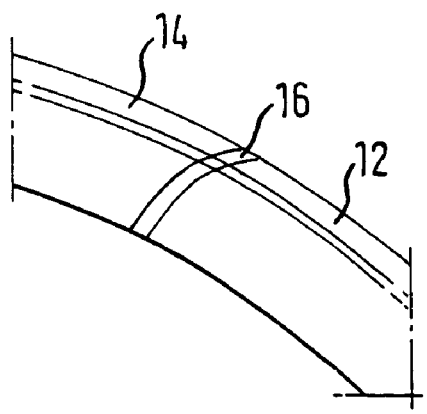
FIG. 3 shows an enlarged transition region between two differently colored regions of the steering wheel produced in accordance with the invention.

During the formation of the second foam surrounding 14, tongues (1 to 2 mm thick) provide for a seal at the color transition regions to the first foam surrounding 12, so that no color can pass over to the first foam surrounding 12. After removal from the mold, the steering wheel 10 is deburred as usual. Then, the transition regions are closed with decorative elements 16, like chrome rings or clips (see FIGS. 2 and 3).

The method according to the invention can, of course, be extended to more than two foam surrounding sections, so that steering wheels with diverse coloring can be produced.

The invention claimed is:

1. A method for the production of a steering wheel (10) having a visible multi-colored foam surrounding, the method comprising the following steps:

formation of a first foam surrounding by surrounding a steering wheel skeleton with foam in a first mold with a first foam so that marginal regions of the first foam surrounding are tapered, the first foam in solidified state having a first color;

covering only the non-tapered regions of the first foam surrounding by one or more masks and applying an in-mold coating to the non-masked regions;

formation of a second visible foam surrounding by introducing a second foam into a second mold, the second foam in solidified state having a second color different from the first color; and sealing transition regions between the first foam surrounding and the second foam surrounding by separating elements so that during the formation of the second foam no color can pass over to the first foam surrounding.

2. The method according to claim 1, wherein after the covering and before the formation of the second foam surrounding, a separator is applied.

3. The method according to claim 2, wherein after the application of the separator, a lacquer is applied.

4. The method according to claim 1, wherein after the formation of the second foam surrounding, the transition regions are closed by decorative elements.

5. The method according to claim 1, wherein at least one further foam surrounding is formed with a further foam, the further foam in solidified state having a color different from the second color.

6. The method according to claim 1 including applying a coating to the first foam surrounding after the covering, removing the covering from the particular regions of the first foam surrounding after applying the coating.

7. The method according to claim 6, wherein the coating is lacquer.

8. The method according to claim 1, wherein the particular regions of the first foam surrounding are covered by one or more removable masks.

9. The method according to claim 1 wherein the first and second foam surroundings are separated by sealing transition regions at outer surfaces of the first and second foam surroundings after removal of the first and second foam surroundings from the second mold.

10. The method according to claim 1 wherein the separating elements are tongues.

11. The method according to claim 1 wherein said first and second foam surroundings are exposed.

12. The method according to claim 1 wherein said first foam surrounding and said second foam surrounding form a toroid, said first foam surrounding having a first end surface and a second end surface, said second foam surrounding having a first end surface adjacent to said first end surface of said first foam surrounding and a second end surface adjacent to said second end surface of said first foam surrounding, said separating elements separating said first end surfaces of said first and second foam surroundings and said second end surfaces of said first and second foam surroundings.

13. The method according to claim 1 wherein said separating elements are spaced from one another.

14. The method according to claim 1 further including the step of deburring the steering wheel.

15. The method according to claim 1 further including the step of closing the transition regions after formation of the first and second foam surroundings with decorative element, each of which, in an assembly state forms a closed ring covering the circumferential surface of the respective transition region.

* * * * *